United States Patent [19]
Contreras

[11] Patent Number: 6,014,281
[45] Date of Patent: Jan. 11, 2000

[54] USING A READ ELEMENT AND A READ/WRITE COUPLING PATH TO DETECT WRITE-SAFE CONDITIONS

[75] Inventor: John T. Contreras, San Jose, Calif.

[73] Assignee: International Business Machines Corporation, Armonk, N.Y.

[21] Appl. No.: 08/985,191

[22] Filed: Dec. 4, 1997

[51] Int. Cl.[7] .............................. G11B 5/02; G11B 5/09
[52] U.S. Cl. ................................................ 360/67; 360/46
[58] Field of Search .................... 360/46, 53, 67

[56] References Cited

U.S. PATENT DOCUMENTS

| | | | |
|---|---|---|---|
| 4,816,932 | 3/1989 | Yates | 360/46 |
| 4,879,610 | 11/1989 | Jove et al. | 360/67 |
| 5,121,356 | 6/1992 | Park et al. | 365/203 |
| 5,291,069 | 3/1994 | Goodings et al. | 307/254 |
| 5,291,347 | 3/1994 | Ngo et al. | 360/68 |
| 5,296,975 | 3/1994 | Contreras et al. | 360/46 |
| 5,343,337 | 8/1994 | Jurneke | 360/63 |
| 5,394,363 | 2/1995 | Han | 365/189.01 |
| 5,532,631 | 7/1996 | Ngo et al. | 327/110 |
| 5,726,821 | 3/1998 | Cloke et al. | 360/46 |
| 5,729,208 | 3/1998 | Ogiwara | 360/46 |

*Primary Examiner*—W. Chris Kim
*Attorney, Agent, or Firm*—Khanh Q. Tran; Banner & Witcoff, Ltd.

[57] ABSTRACT

A circuit and method for detecting write-safe conditions for a magnetic storage device The circuit includes an electrical interconnect, a write-safe circuit, a write-driver circuit, a read amplifier and a read/write element. The electrical interconnect has a write path and a read path. A read element is coupled to one end of the read path, while the read amplifier is coupled to the other end of the read path. A write element is coupled to an end of the write path that is in proximity to the read element, while a write-output circuit is coupled to the other end of the write path. Preferably, the write element and the read element are part of a magnetoresistive head, such as a Piggyback-Magneto-Resistive head. The write-safe circuit, coupled to the read amplifier, detects a write-safe condition based on a signal induced into the read path by a write signal on the write path. The read amplifier is coupled to the read path between the read path and the write-safe circuit, and amplifies the voltage signal induced into the read path.

57 Claims, 3 Drawing Sheets

USING A READ ELEMENT AND A READ/WRITE COUPLING PATH TO DETECT WRITE-SAFE CONDITIONS

BACKGROUND OF THE INVENTION

1. Field of the Invention

The present invention relates to the field of data storage devices, such as disk drives. More particularly, the present invention relates to a circuit and a method for detecting write-safe conditions for magnetic storage devices using magneto-resistive (MR) heads.

2. Description of the Related Art

FIG. 1 shows a schematic diagram of a conventional H-type write-driver circuit 10 having a conventional voltage-sense write-safe circuit 20. Write-driver circuit 10 is coupled to write element of an MR-type head 30 through electrical interconnect circuit 40. MR-type head 30 includes a write element 31 and an MR read element. Write element 31 is conventionally modelled by a capacitance $C_w$ that is in parallel to a series connection of a resistance $R_w$ and an inductance $L_w$. Changes in current output by write-driver circuit 10 produces changes in magnetic flux at write element 31 that are recorded on a magnetic media, such as a tape or disk, in a well-known manner. Example of MR-type heads that can be used for head 30 are a Magneto-Resistive (MR) head, a Piggyback-Magneto-Resistive (PMR), and a Giant Magneto-Resistive (GMR) head (sometimes called spin valve head). Write-driver circuit 10 and write-safe circuit 20 are typically contained in a R/W integrated circuit (IC), represented by write-driver circuit 10 and write-safe circuit 20 being shown to the left of line 50. The components of FIG. 1 appearing to the right of line 50 are external to the R/W IC. The R/W IC is typically attached to the actuator used in a disk drive (not shown).

Write-safe circuit 20 is connected to the output of write-driver circuit 10 which detects the write conditions for reliably writing data to a magnetic tape or disk. A typical write-safe circuit 20, shown in FIG. 1, includes a buffer 21 coupled to the output of write-circuit 10. The output of buffer 21 is coupled to a write-safe logic circuit 22. Write-safe logic circuit 22 typically includes a comparator or a peak detection circuit for detecting write-safe conditions. Additionally, write-safe logic circuit 22 typically includes a timing circuit for detecting any improper $I_w$ transition rates at write element 31. Of the three write-safe conditions detected by write-safe circuits 20, two conditions are failure operational modes, while the third condition is a normal operational mode. The two failure operational modes are (1) a high ohmic, or open, connection to write element 31, and (2) a low ohmic, or short, connection to write element 31. Write-safe logic circuit provides a logic output for signalling detected write-safe conditions.

Write-driver circuit 10 includes transistors Q1–Q4 connected to write element 31 in a well-known H configuration. The collector-to-emitter paths of transistors Q1 and Q3 are connected in series to form a current path from a first power supply voltage $V_{CC}$ to a second power supply voltage $V_{EE}$. Similarly, the collector-to-emitter paths of transistors Q2 and Q4 are connected in series to form a current path from $V_{CC}$ to $V_{EE}$. Write element 31 is connected across the two current paths at the emitter-collector junction of transistors Q1 and Q3 and at the emittercollector junction of transistors Q2 and Q4.

Transistors Q3 and Q4 are driven by an input voltage $V_{Win}$ that is applied across inputs 11 and 12, respectively. Input voltage $V_{Win}$ causes transistors Q3 and Q4 to operate in a well-known complementary manner, that is, when transistor Q3 is conducting, transistor Q4 is non-conducting and, conversely, when transistor Q4 is conducting, transistor Q3 is non-conducting. The H configuration of transistors Q1–Q4 is configured so that transistor Q1 is non-conducting when transistor Q3 is conducting, but is conducting when transistor Q4 is conducting. Similarly, transistor Q2 is non-conducting when transistor Q4 is conducting, but is conducting when transistor Q3 is conducting. By changing the polarity of $V_{Win}$ applied across inputs 11 and 12, the direction of write current $I_w$ through write element 31 is controlled accordingly. Changes in the direction of $I_w$ cause changes in the magnetic flux produced at write element 31. The flux changes represent encoded data that are recorded on a magnetic media, such as a tape or disk, and that are later read back for retrieving the recorded data.

Parasitic capacitance at the output of a write-driver circuit limits the rate at which data can be written or stored for a magnetic storage device. The parasitic capacitance adversely affects the output performance of a write-driver, that is, the transition (rise and fall) times of the write current ($I_w$) at the output of a write-driver are degraded. There are several sources contributing to the total parasitic capacitance appearing at the output of a conventional write-driver circuit. Four of the more significant sources of parasitic capacitance, as shown in FIG. 1, are write driver 10, write-safe circuit 20, write element 31 and electrical interconnect 40 between write-driver circuit 10 and write element 31.

Write-driver circuit 10 and write-safe circuit 20 contribute the most significant portion of the total parasitic capacitance appearing at the output of write-driver circuit 10. The parasitic capacitance contributed by write-driver circuit 10 is represented in FIG. 1 by $C_{Par11}$ and $C_{Par12}$. The parasitic capacitance contributed by write-safe circuit 20 is represented in FIG. 1 by $C_{Par21}$ and $C_{Par22}$. This portion of the parasitic capacitance, all associated with the R/W IC, is inherent to the active and passive semiconductor devices used within the IC and the electrical conductors connecting the circuit devices to the I/O pads of the R/W IC.

What is needed is a way to achieve faster $I_w$ current transitions so that faster data write rates can be achieved.

SUMMARY OF THE INVENTION

The present invention provides a technique for sensing write-safe conditions for a magnetic memory device that achieves faster $I_w$ current transitions, and thus achieves faster write data rates. The advantages of the present invention are provided by a circuit having an electrical interconnect, a write-safe circuit, a write-driver circuit and a read amplifier. The electrical interconnect has a write path and a read path. A read element is coupled to one end of the read path, while the write-safe circuit is coupled to the other end of the read path. A write element is coupled to an end of the write path that is in proximity to the read element, while a write-output circuit is coupled to the other end of the write path. Preferably, the write element and the read element are part of a magneto-resistive head, such as a Piggyback-Magneto-Resistive head. The write-safe circuit is coupled to the read path of the electrical interconnect and detects a write-safe condition based on a signal induced into the read path by a write signal on the write path. The read amplifier is coupled to the read path between the read path and the write-safe circuit, and amplifies the voltage signal induced into the read path.

According to the invention, the induced signal can correspond to either voltage or current signal transitions occurring in the write signal. The induced signal is coupled to the read path from the write path by inductive and capacitive coupling between the read path and the write path, and by a write signal produced by the write element being sensed by the read element. The write-safe circuit detects write-safe conditions including a high ohmic condition of the write element, a low ohmic condition of the write element, and a normal write operating condition. Additionally, the write-safe circuit detects a transition rate of the write element.

The present invention also provides a method for detecting write-safe conditions for a magnetic storage device in which a write signal is only coupled from the write path to the read path of an electrical interconnect, a signal induced on a read path of the electrical interconnect by the write signal on the write path, and a write-safe condition is detected based on the induced signal on the read path.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides faster write data rates by using a circuit and a method for detecting write-safe conditions for a magnetic storage system. According to the invention, write-safe conditions are detected using a read element and the electrical interconnect between the read element and a write-driver circuit. Unlike conventional write-driver techniques, the read-element technique of the present invention adds no parasitic capacitance to the output of a write-driver circuit caused by a write-safe circuit.

Figure 1:
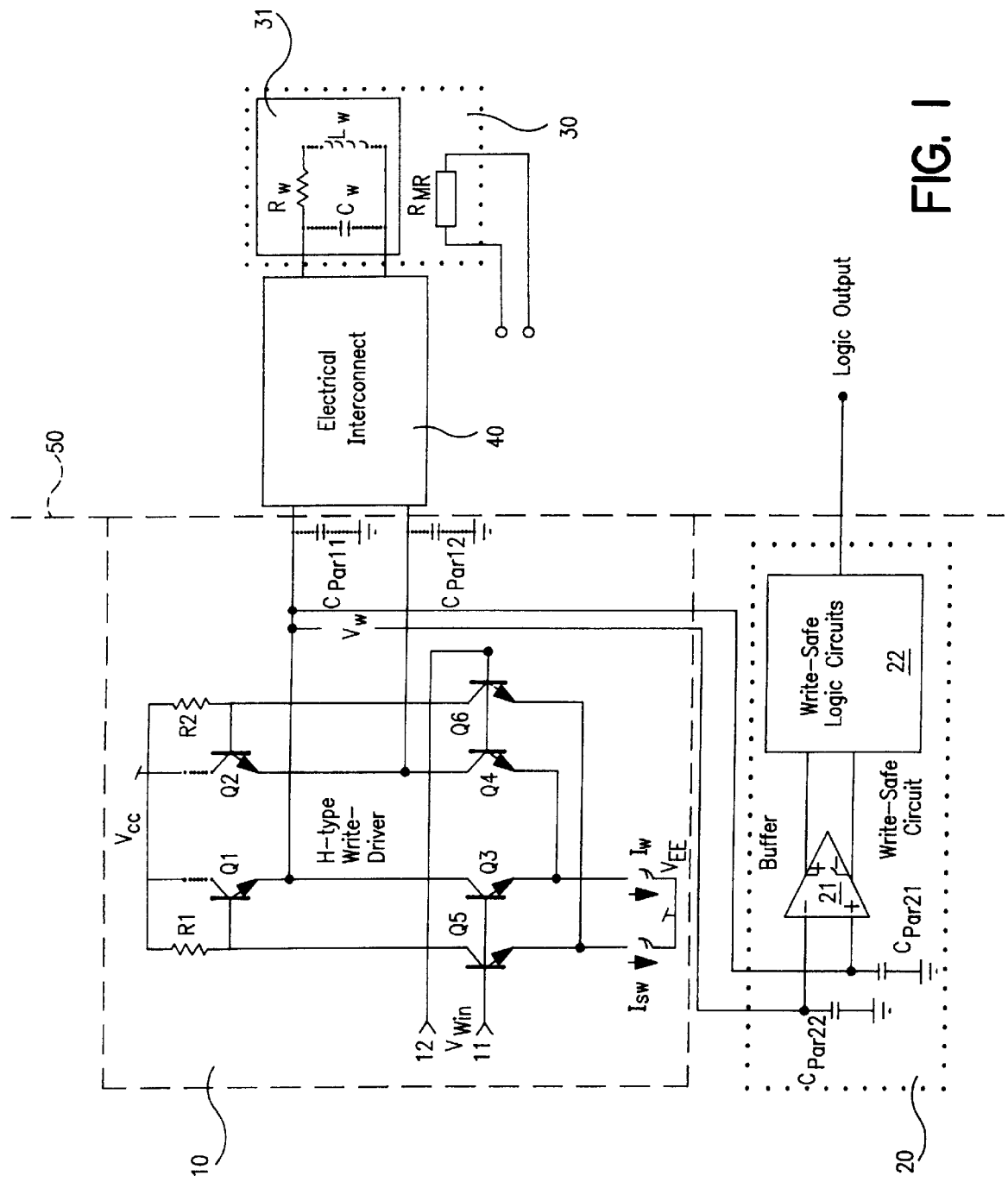
FIG. 1 shows a schematic diagram of a conventional H-type write-driver having a conventional voltage-sense write-safe circuit.
Figure 2:
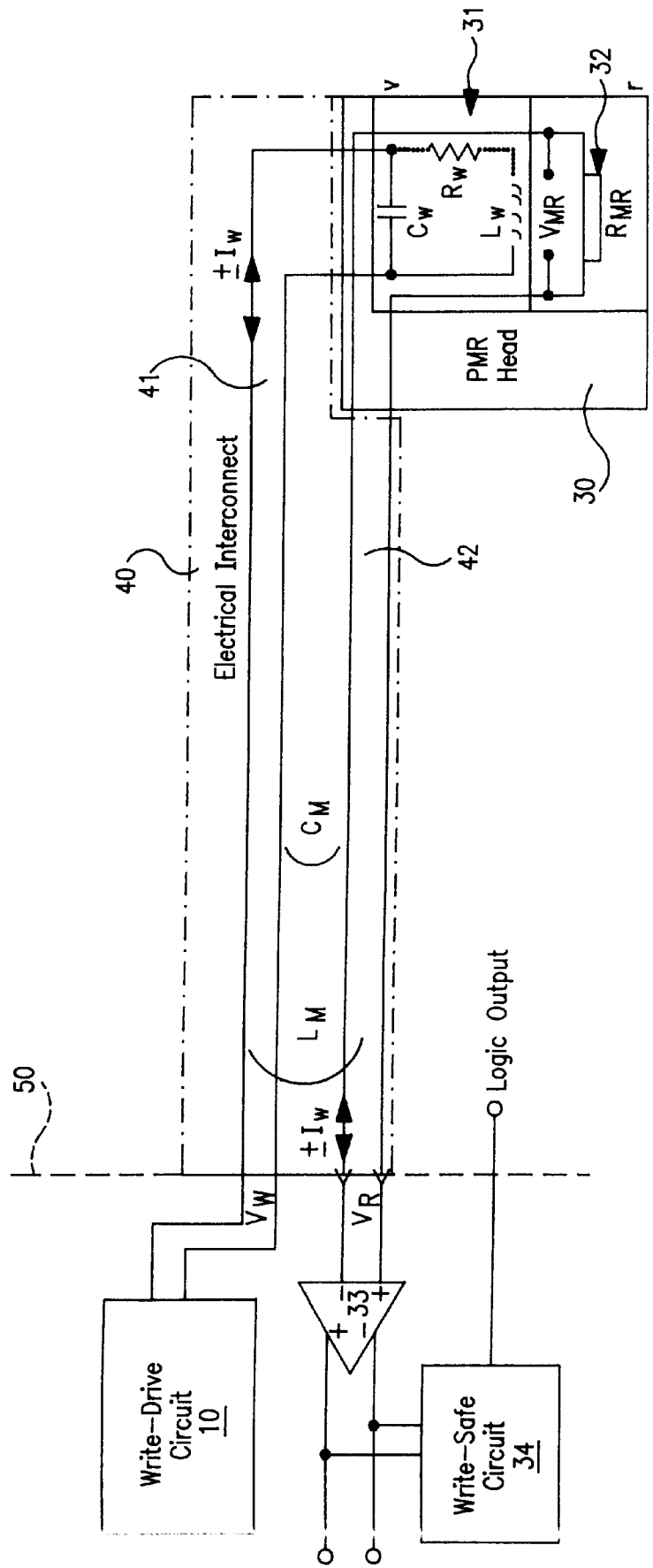
FIG. 2 shows a schematic diagram of a Piggyback-Magneto-Resistive (PMR) head and an electrical interconnection to the PMR head.

Write-safe conditions for a magnetic storage system are detected using a read element of a Piggyback-Magneto-Resistive (PMR) head, which contains both a write element and a read element, and the electrical interconnect between a write-driver circuit and the PMR head. FIG. 2 shows a schematic diagram of a PMR head 30 and details of an electrical interconnect 40 to PMR head 30. Electrical interconnect 40 includes a bi-directional pair of conductors, with one pair of conductors 41 connecting the write-driver circuit to write element 31, and the other pair of conductors 42 connecting a read element 32 to a read amplifier 33. A conventional write-safe circuit 34 is coupled to the output of read amplifier 33. While read amplifier 33 is shown as being a differential amplifier, read amplifier can also be a single-ended amplifier.

The present invention detects write-safe conditions by detecting a read voltage $V_R$ that is induced into the read path by the output of the write-driver circuit and which appears at the input of the R/W IC, as shown in FIG. 2. Read amplifier 33 senses and amplifies the induced write voltage $V_R$. Write-safe circuit 34, coupled to the output of read amplifier 33, detects $I_w$ transitions occurring at write element 31. Multiple read ports can share a common write-safe circuit 34 in a well-known manner.

Figure 3A:
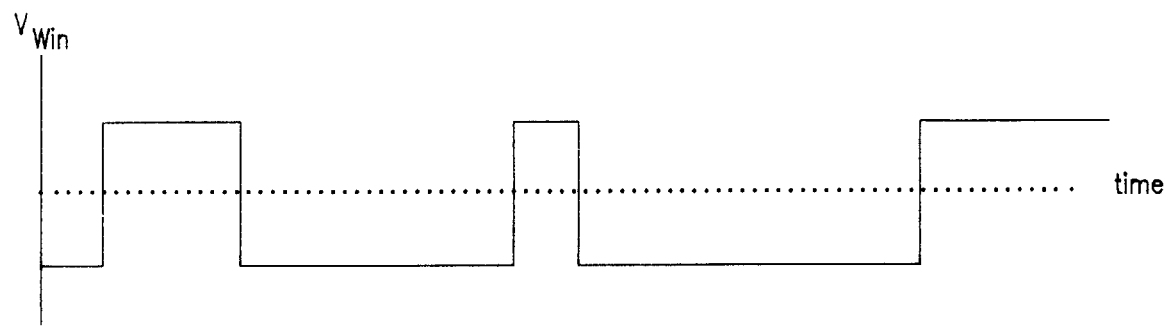
FIGS. 3(a) and 3(b) respectively show signal waveform diagrams for an input voltage applied to a write-drive circuit voltage and sensed read voltages corresponding to different write-safe conditions.
Figure 3B:
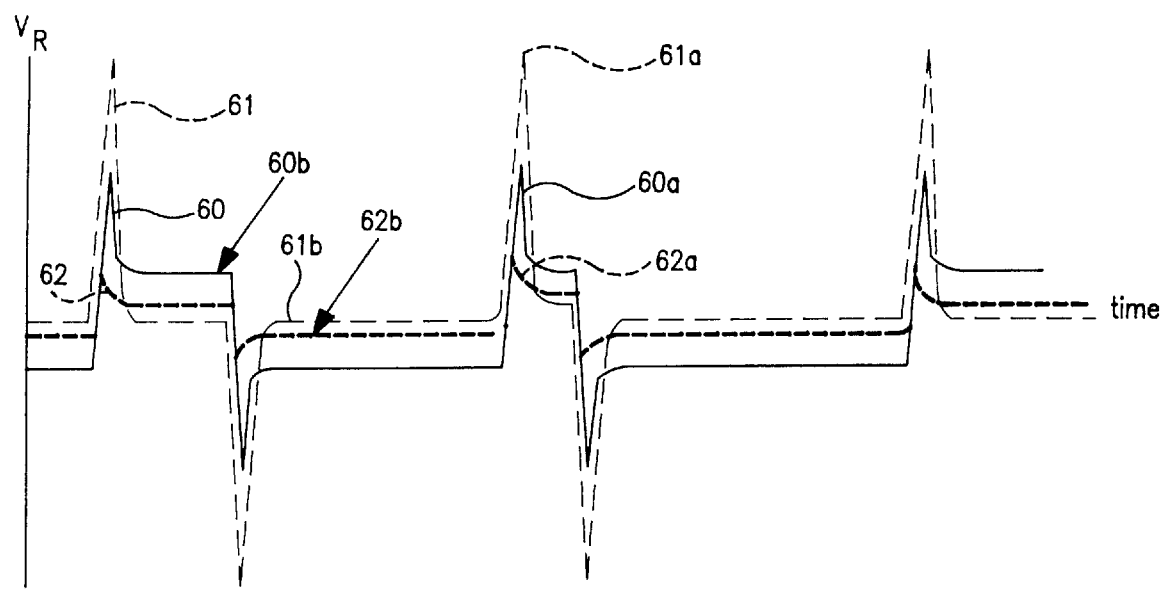

The voltage levels of induced write voltage $V_R$ are translated into the three different modes of operation that are detected by a conventional write-safe circuit: a high ohmic or open connection to the write element (failure mode); a low ohmic or short connection to the write element (failure mode); and a normal mode write condition. FIGS. 3(a) and 3(b) respectively show signal waveform diagrams for an input voltage $V_{Win}$ applied to a write-drive circuit and sensed read voltages corresponding to different write-safe conditions. FIG. 3(a) shows an exemplary input voltage $V_{Win}$ as a function of time t. FIG. 3(b) shows waveforms 60, 61 and 62 for induced voltage $V_R$ corresponding to the three write-safe conditions detected by the present invention.

Waveform 60 in FIG. 3(b) corresponds to a normal mode write condition. Waveform 61 corresponds to a high ohmic or open connection condition. Waveform 62 corresponds to a low ohmic or short connection condition. Waveform 61 has a relatively high transient overshoot 61a with respect to the transient overshoot 60a for a normal mode write condition. Conversely, the steady-state portion 61b of waveform 61 has a relatively smaller steady-state response with respect to the steady state portion 60b of waveform 60. Waveform 62 has a relatively low transient overshoot 62a with respect to normal mode transient overshoot 60a. The steady-state portion 62b of waveform 62 has a relatively smaller steady-state portion 62b with respect of normal mode steady-state portion 60b.

Write-safe circuit 34 is a conventional write-safe circuit that includes a comparator, or a peak detection circuit, that operates in combination with a timing circuit for detecting the three modes of operation and any incorrect $I_w$ transition rates of write element 31 in a well-known manner. The specific voltage level associated with each write-safe condition depends on operating characteristics of both write-driver circuit 10 and electrical interconnect 40. Once the specific voltage levels for each condition having been established for a particular design, either empirically or by design, threshold voltages used within write-safe circuit 34 can be set and incorporated into the write-safe circuitry.

FIG. 2 shows the two coupling mechanisms contributing to induced read voltage $V_R$ during a PMR-type head writing operation. The first coupling mechanism is attributed to read element 32. A write signal produced by write element 31 is sensed by read element 32, which in turn produces a $V_{MR}$ voltage at read element 32. Voltage $V_{MR}$ has both a transient and a steady state component.

The second coupling mechanism inducing voltage $V_R$ is attributed to a near-end cross-talk noise voltage $V_{RNE}$ associated with electrical interconnect 40 between a R/W IC and a PMR-type head 30. A near-end cross-talk noise voltage $V_{RNE}$ is measured at $V_R$. Voltage $V_{RNE}$ depends on the impedance of the load driven by write-driver circuit 10, and the inductive ($L_M$) and capacitive ($C_M$) coupling from the write path to the read path electrical interconnect. Voltage $V_{RNE}$ has only a transient component.

When the read amplifier uses a voltage or current bias for read element 32 while writing ($R_{MR}$ biased), induced voltage $V_R$ can be written as the contribution from the two coupling mechanisms $V_{MR}$ and $V_{RNE}$ as:

$$V_R = V_{RNE} + V_{MR} \tag{1}$$

This biased situation is shown in FIG. 3 and is typical for fast write-to-read recovery designs.

When the read amplifier does not use a bias for the read element while writing (no bias for $R_{MR}$), the $V_{MR}$ voltage is negligible. Consequently, the induced $V_R$ voltage is dominated by the near-end cross-talk noise voltage $V_{RNE}$. For this unbiased situation, only the voltage spikes of the waveforms shown in FIG. 3 occur for $I_w$ transitions. The respective peaks for the unbiased condition have different signal characteristics than the waveforms shown in FIG. 3, such as peak transient magnitude and time constant, but can be used in a well-known manner for detecting proper write conditions.

The induced $V_R$ voltage can alternatively be converted to a current $I_R$ that can be used by write-safe circuit 34 for detecting $I_w$ transitions at write element 31. That is, the $I_R$ current is derived from the following equation:

$$I_R = V_R/(R_{MR} + r_{amp}) \qquad (2)$$

where, $r_{amp}$ is the input impedance of the read amplifier.

In addition to removing the write-safe circuit parasitic capacitance $C_{Par21}$ and $C_{Par22}$ from the output of write-drive circuit 10, the present invention also requires no interface circuit (voltage transfer or shift) for connecting between a write-driver circuit and write-safe circuits. Such an interface circuit is typically for write-driver circuits requiring a high (>5 V) or dual supply voltage, and requires specialized designs or devices for accommodating high voltage levels.

While the present invention has been described in connection with the illustrated embodiments, it will be appreciated and understood that modifications may be made without departing from the true spirit and scope of the invention.

What is claimed is:

1. A circuit for detecting write-safe conditions for a magnetic storage device, the circuit comprising:
    an electrical interconnect having a write path and a read path; and
    a write-safe circuit coupled to the read path of the electrical interconnect, the write-safe circuit detecting a write-safe condition based on a signal induced into the read path by a write signal on the write path.

2. The circuit according to claim 1, wherein the induced signal corresponds to signal transitions occurring in the write signal.

3. The circuit according to claim 2, wherein the induced signal includes voltage transitions induced by the signal transitions occurring in the write signal.

4. The circuit according to claim 2, wherein the induced signal includes current transitions induced by the signal transitions occurring in the write signal.

5. The circuit according to claim 2, wherein the induced signal is coupled to the read path from the write path by at least one of inductive coupling between the read path and the write path, and capacitive coupling between the read path and the write path.

6. The circuit according to claim 2, wherein the electrical interconnect has a first end and a second end,
    wherein the write path and the read path each have a first end and a second end, the first end of write path and the first end of the read path being at the first end of the electrical interconnect, and
    wherein the write-safe circuit is coupled to the first end of the read path,
    the circuit further comprising:
        a read element coupled to the second end of the read path;
        a write-output circuit coupled to the first end of the write path; and
        a write element coupled to the second end of the write path.

7. The circuit according to claim 6, wherein the induced signal is coupled to the read path from the write path by at least one of inductive coupling between the read path and the write path, and capacitive coupling between the read path and the write path.

8. The circuit according to claim 7, wherein the induced signal is further coupled to the read path by a write signal produced by the write element being sensed by the read element.

9. The circuit according to claim 6, wherein the write element and the read element are part of a magneto-resistive head.

10. The circuit according to claim 9, wherein the magneto-resistive head is a Piggyback-Magneto-Resistive head.

11. The circuit according to claim 6, wherein the read path is a first pair of conductors, and the write path is a second pair of conductors.

12. The circuit according to claim 6, further comprising a read amplifier coupled to the first end of the read path between the read path and the write-safe circuit, the read amplifier amplifying the voltage signal induced into the read path.

13. The circuit according to claim 12, wherein the read amplifier is a differential amplifier.

14. The circuit according to claim 12, wherein the read amplifier is a single-ended amplifier.

15. The circuit according to claim 12, wherein the read amplifier biases the read element when the write signal is on the write path.

16. The circuit according to claim 15, wherein the read amplifier biases the read element with a current.

17. The circuit according to claim 15, wherein the read amplifier biases the read element with a voltage.

18. The circuit according to claim 12, wherein the read amplifier applies no bias to the read element when the write signal is on the write path.

19. The circuit according to claim 6, wherein the write-safe condition detected by the write-safe circuit is a high ohmic condition of the write element.

20. The circuit according to claim 6, wherein the write-safe condition detected by the write-safe circuit is a low ohmic condition of the write element.

21. The circuit according to claim 6, wherein the write-safe circuit further detects a transition rate of the write element based on the signal induced into the read path by the write signal.

22. An integrated circuit for detecting write-safe conditions for a magnetic storage device, the circuit comprising:
    a read amplifier outputting an amplified induced read path signal, the induced read path signal being induced by a write path signal; and
    a write-safe circuit coupled to the amplified induced read path signal and detecting a write-safe condition based on the amplified induced read path signal.

23. The integrated circuit according to claim 22, wherein the read amplifier is a differential amplifier.

24. The integrated circuit according to claim 22, wherein the read amplifier is a single-ended amplifier.

25. The integrated circuit according to claim 22, wherein the read amplifier biases the read element when the write signal is on the write path.

26. The integrated circuit according to claim 25, wherein the read amplifier biases the read element with a current.

27. The integrated circuit according to claim 25, wherein the read amplifier biases the read element with a voltage.

28. The integrated circuit according to claim 22, wherein the read amplifier applies no bias to the read element when the write signal is on the write path.

29. The integrated circuit according to claim 22, wherein the induced read path signal corresponds to signal transitions occurring in the write path signal.

30. The integrated circuit according to claim 29, wherein the induced read path signal includes voltage transitions induced by the signal transitions occurring in the write path signal.

31. The integrated circuit according to claim 29, wherein the induced read path signal includes current transitions induced by the signal transitions occurring in the write path signal.

32. The integrated circuit according to claim 29, wherein the induced read path signal is coupled to the read path from the write path by at least one of inductive coupling between the read path and the write path, and capacitive coupling between the read path and the write path.

33. The integrated circuit according to claim 29, wherein the read path and the write path are part of an electrical interconnect,
wherein the write path and the read path each have a first end and a second end, the first end of write path and the first end of the read path being at the first end of the electrical interconnect, and
wherein the read amplifier is coupled to the first end of the read path,
wherein a read element is coupled to the second end of the read path,
wherein a write element coupled to the second end of the write path,
the integrated circuit further comprising a write-output circuit coupled to the first end of the write path.

34. The integrated circuit according to claim 33, wherein the induced read path signal is coupled to the read path from the write path by at least one of inductive coupling between the read path and the write path, and capacitive coupling between the read path and the write path.

35. The integrated circuit according to claim 34, wherein the induced read path signal is further coupled to the read path by a write signal produced by the write element being sensed by the read element.

36. The integrated circuit according to claim 33, wherein the write element and the read element are part of a magneto-resistive head.

37. The integrated circuit according to claim 36, wherein the magneto-resistive head is a Piggyback-Magneto-Resistive head.

38. The integrated circuit according to claim 22, wherein the write-safe condition detected by the write-safe circuit is a high ohmic condition of the write element.

39. The integrated circuit according to claim 22, wherein the write-safe condition detected by the write-safe circuit is a low ohmic condition of the write element.

40. The integrated circuit according to claim 22, wherein the write-safe circuit further detects a transition rate of the write element based on the signal induced into the read path by the write signal.

41. A method for detecting write-safe conditions for a magnetic storage device, the method comprising the steps of comprising:

coupling a write signal to a write path of an electrical interconnect;
sensing an induced signal on a read path of the electrical interconnect, the induced signal being induced by the write signal on the write path; and
detecting a write-safe condition based on characteristics of the induced signal on the read path.

42. The method according to claim 41, wherein the induced signal corresponds to signal transitions occurring in the write signal.

43. The method according to claim 42, wherein the induced signal includes voltage transitions induced by the signal transitions occurring in the write signal.

44. The method according to claim 42, wherein the induced signal includes current transitions induced by the signal transitions occurring in the write signal.

45. The method according to claim 44, wherein the induced signal is coupled to the read path from the write path by at least one of inductive coupling between the read path and the write path, and capacitive coupling between the read path and the write path.

46. The method according to claim 45, wherein a write element is coupled to the write path, a read element is coupled to the read path, and the induced signal is further coupled to the read path by a write signal produced by the write element being sensed by the read element.

47. The method according to claim 42, wherein the write path is coupled to a write element, and the read path is coupled to a read element.

48. The method according to claim 47, wherein the write element and the read element are part of a magneto-resistive head.

49. The method according to claim 48, wherein the magneto-resistive head is a Piggyback-Magneto-Resistive head.

50. The method according to claim 47, wherein the read path is a first pair of conductors, and the write path is a second pair of conductors.

51. The method according to claim 47, wherein the step of sensing the induced signal includes the step of amplifying the induced signal.

52. The method according to claim 47, further comprising the step of biasing the read element when the write signal is coupled to the write path.

53. The method according to claim 52, wherein the step of biasing the read element uses a current for biasing the read element.

54. The method according to claim 52, wherein the step of biasing the read element uses a voltage for biasing the read element.

55. The method according to claim 47, wherein the detected write-safe condition is a high ohmic condition of the write element.

56. The method according to claim 47, wherein the detected write-safe condition is a low ohmic condition of the write element.

57. The method according to claim 47, further comprising the step of detecting a transition rate of the write element based on the induced signal.

* * * * *